(12) United States Patent
Rodney et al.

(10) Patent No.: US 8,618,803 B2
(45) Date of Patent: Dec. 31, 2013

(54) WELL LOCATION DETERMINATION APPARATUS, METHODS, AND SYSTEMS

(75) Inventors: Paul F. Rodney, Spring, TX (US); David Lyle, Houston, TX (US); Mac Upshall, Edmonton (CA); Richard Thomas Hay, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/378,515

(22) PCT Filed: Apr. 13, 2010

(86) PCT No.: PCT/US2010/030900
§ 371 (c)(1),
(2), (4) Date: Mar. 5, 2012

(87) PCT Pub. No.: WO2010/147699
PCT Pub. Date: Dec. 23, 2010

(65) Prior Publication Data
US 2012/0158305 A1  Jun. 21, 2012

Related U.S. Application Data

(60) Provisional application No. 61/187,818, filed on Jun. 17, 2009.

(51) Int. Cl.
*G01V 3/26* (2006.01)
(52) U.S. Cl.
USPC .............................. 324/326; 324/356; 324/346
(58) Field of Classification Search
USPC ............... 324/207.22, 207.26, 326, 346, 354; 175/45
See application file for complete search history.

(56) References Cited

U.S. PATENT DOCUMENTS 3,488,574 A * 1/1970 Tanguy .................. 324/373
4,372,398 A   2/1983 Kuckes
(Continued)

FOREIGN PATENT DOCUMENTS

WO   WO-2009014838 A1   1/2009
WO   WO-2010/147699 A1  12/2010

OTHER PUBLICATIONS

"International Application Serial No. PCT/US2010/030900, Search Report mailed Jun. 3, 2010", 4 pgs.

(Continued)

*Primary Examiner* — Jay Patidar
(74) *Attorney, Agent, or Firm* — Schwegman, Lundberg & Woessner, P.A.; Alan Bryson

(57) ABSTRACT

In some embodiments, apparatus and systems, as well as methods, may operate to launch a set of currents into a corresponding set of existing well casings; monitor, in a well under construction, changes in at least one of a magnetic field or an electric field perturbed by the set of currents after each one of the set is launched; and determine a location of the well under construction in relation to the set of existing well casings. In some embodiments, the activities include inducing current into a drillstring located in a well under construction; monitoring, at a set of existing well casings, changes in at least one of a magnetic field or an electric field perturbed by the current after the current is induced; and determining a location of the well under construction in relation to the set of existing well casings. Additional apparatus, systems, and methods are disclosed.

26 Claims, 11 Drawing Sheets

(56) References Cited

U.S. PATENT DOCUMENTS

| | | | |
|---|---|---|---|
| 4,529,939 A | 7/1985 | Kuckes | |
| 4,700,142 A | 10/1987 | Kuckes | |
| 4,791,373 A | 12/1988 | Kuckes | |
| 4,933,640 A | 6/1990 | Kuckes | |
| 5,074,365 A * | 12/1991 | Kuckes | 175/40 |
| 5,103,920 A * | 4/1992 | Patton | 175/45 |
| 5,218,301 A | 6/1993 | Kuckes | |
| 5,258,755 A | 11/1993 | Kuckes | |
| 5,305,212 A | 4/1994 | Kuckes | |
| 5,343,152 A * | 8/1994 | Kuckes | 324/346 |
| 5,485,089 A | 1/1996 | Kuckes | |
| 5,512,830 A | 4/1996 | Kuckes | |
| 5,589,775 A * | 12/1996 | Kuckes | 324/346 |
| 5,676,212 A | 10/1997 | Kuckes | |
| RE36,569 E | 2/2000 | Kuckes | |
| 6,075,462 A * | 6/2000 | Smith | 340/854.6 |
| 6,150,954 A * | 11/2000 | Smith | 340/854.6 |
| 6,736,222 B2 | 5/2004 | Kuckes et al. | |
| 6,842,699 B2 | 1/2005 | Estes et al. | |
| 6,927,741 B2 * | 8/2005 | Brune et al. | 343/867 |
| 7,095,232 B2 | 8/2006 | Haber et al. | |
| 7,413,034 B2 * | 8/2008 | Kirkhope et al. | 175/76 |
| 2004/0239329 A1 * | 12/2004 | Haber et al. | 324/339 |
| 2006/0113112 A1 | 6/2006 | Waters | |
| 2007/0126426 A1 | 6/2007 | Clark et al. | |
| 2010/0271232 A1 * | 10/2010 | Clark et al. | 340/853.2 |
| 2011/0309836 A1 * | 12/2011 | Bittar et al. | 324/339 |

OTHER PUBLICATIONS

"International Application Serial No. PCT/US2010/030900, Written Opinion mailed Jun. 3, 2010", 9.

"British Application Serial No. 1121559.7, Office Action mailed Nov. 13, 2012", 3 pgs.

"International Application Serial No. PCT/US2010/030900, International Preliminary Report on Patentability mailed Aug. 31, 2012", 5 pgs.

"Norwegian Application Serial No. 20120021, Office Action mailed Oct. 15, 2012", w/ EN Translation, 5 pgs.

"British Application Serial No. 1121559.7, Response filed Dec. 21, 2012 to Office Action mailed Nov. 13, 2012", 14 pgs.

* cited by examiner

WELL LOCATION DETERMINATION APPARATUS, METHODS, AND SYSTEMS

RELATED APPLICATION

This patent application is a U.S. National Stage Filing under 35 U.S.C. 371 from International Application No. PCT/US2010/030900, filed Apr. 13, 2010, and published as WO 2010/147699 A1 on Dec. 23, 2010, which claims priority under 35 U.S.C. 119(e) to U.S. Provisional Patent Application Ser. No. 61/187,818, filed Jun. 17, 2009, which applications and publication are incorporated herein by reference in their entirety.

BACKGROUND

Currently, it is relatively difficult and potentially expensive to steer a drill bit through a field crowded with producing oil wells as a part of constructing a new well, without interrupting production of any of the other wells in the field.

DETAILED DESCRIPTION

The various embodiments described herein operate to provide information that assists in verifying the location of a well being drilled within a field of other wells. Incorporated by reference herein in their entirety are U.S. Pat. Nos. 7,413,034; 6,150,954; 5,343,152; and 5,074,365. The apparatus, systems, and methods disclosed therein are all assigned to the assignee of the embodiments described herein: Halliburton Energy Services, Inc. Any and all portions of the apparatus, systems, and methods described in each of these documents may be used to realize the various embodiments described herein.

A variety of circumstances can arise for which the apparatus, systems, and methods described herein can be useful. For example, various embodiments may operate to provide a mechanism for steering a drill bit through a very crowded field of oil producing wells without interrupting the production of any of the wells. Previously, this was sometimes accomplished with active steering, for example using a rotary magnetic steering tool, but in that case, production was shut down for at least one of the nearby wells in order to pick up the signals from the rotating magnet.

Some operators drill while passively steering through such fields when the casing in existing wells has been magnetically polarized. However, even when the casing has been magnetically polarized, it can be shown using finite element analysis that the presence of magnetic casing can be extremely difficult to detect until one is so close (a few feet) to the casing that collision is imminent. If the situation is detected in time, a collision can be avoided, but at considerable cost in terms of modifying the drilling trajectory.

Figure 1A:
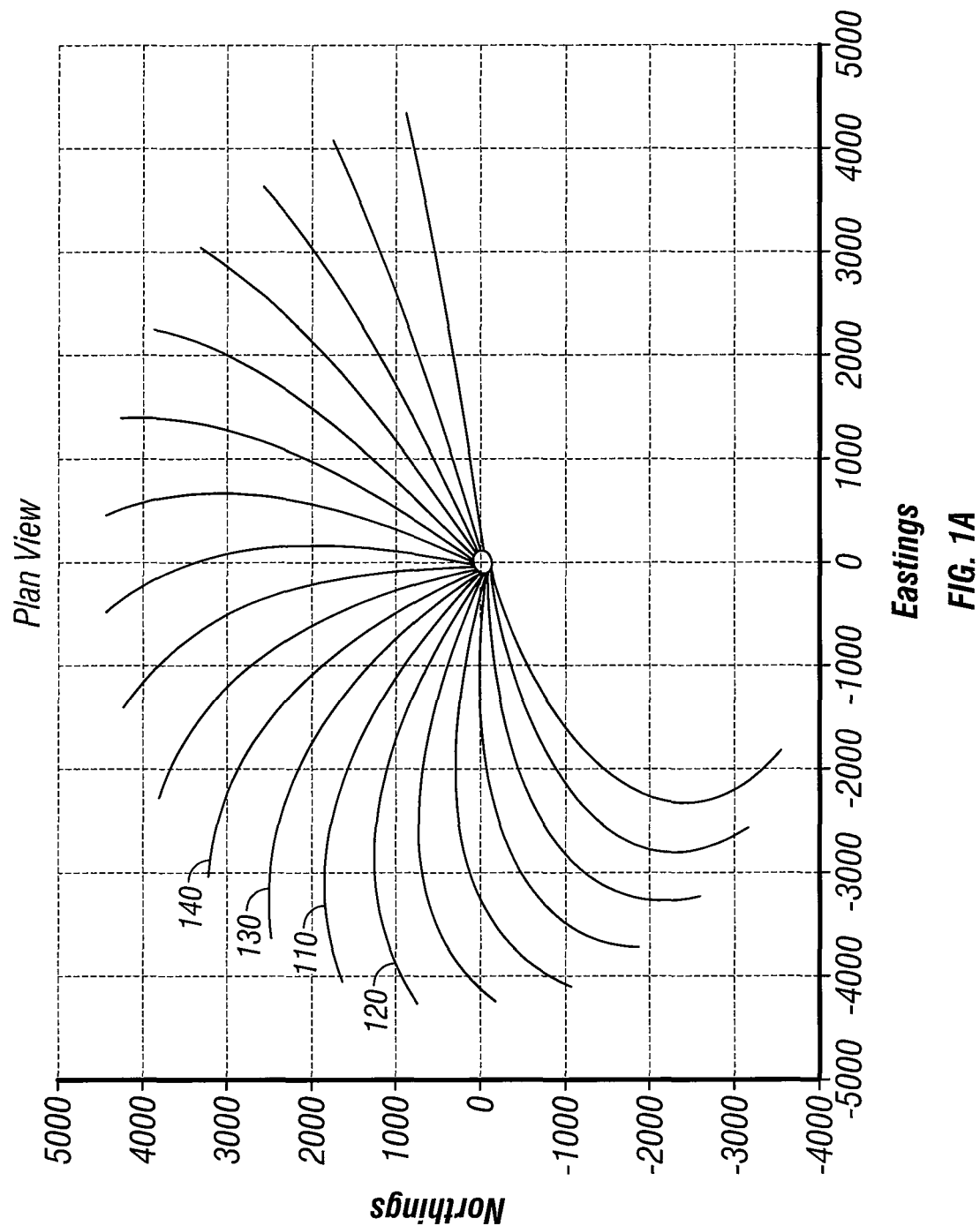
FIGS. 1a-1d illustrate well trajectories according to various embodiments of the invention.
Figure 1B:
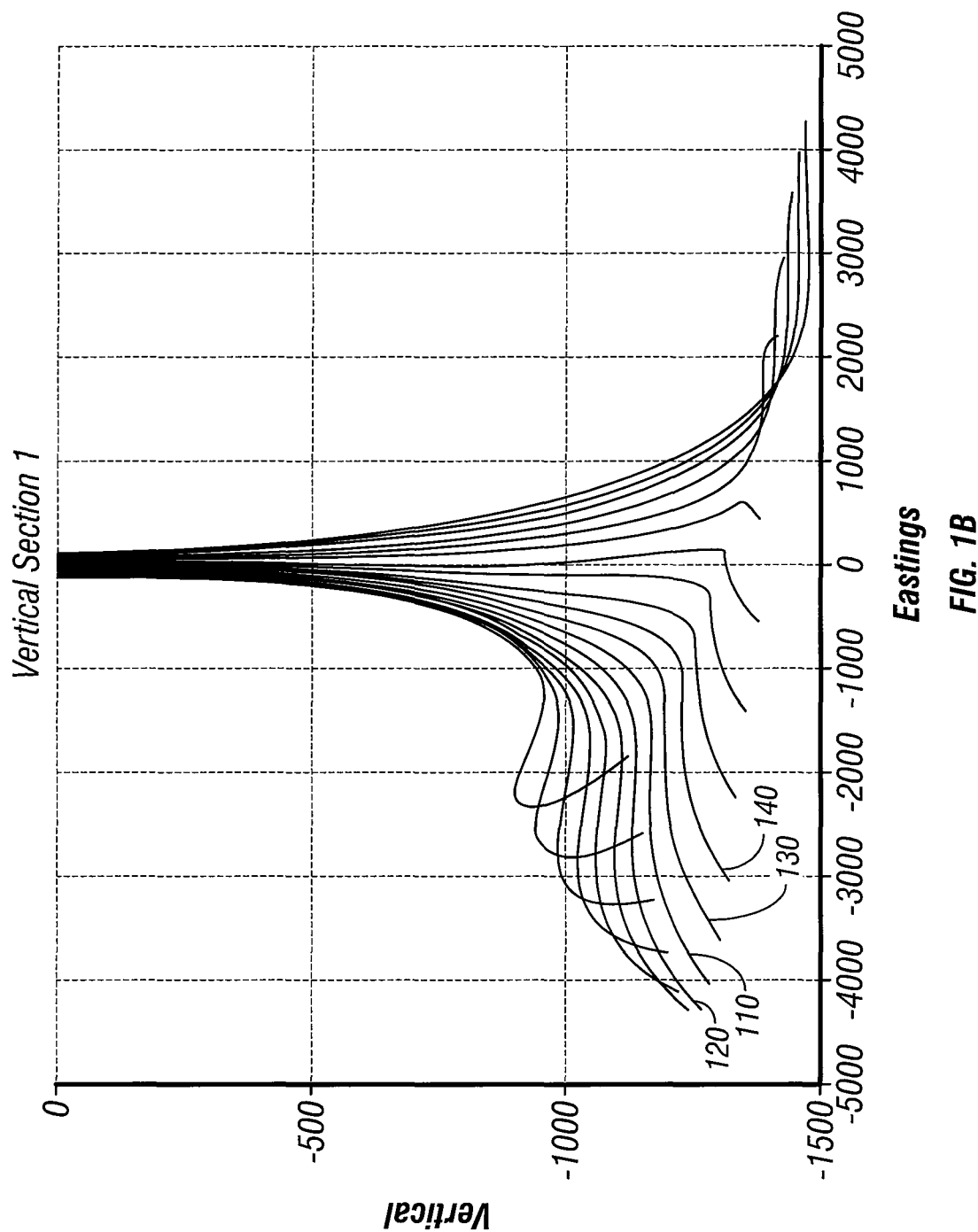
Figure 1C:
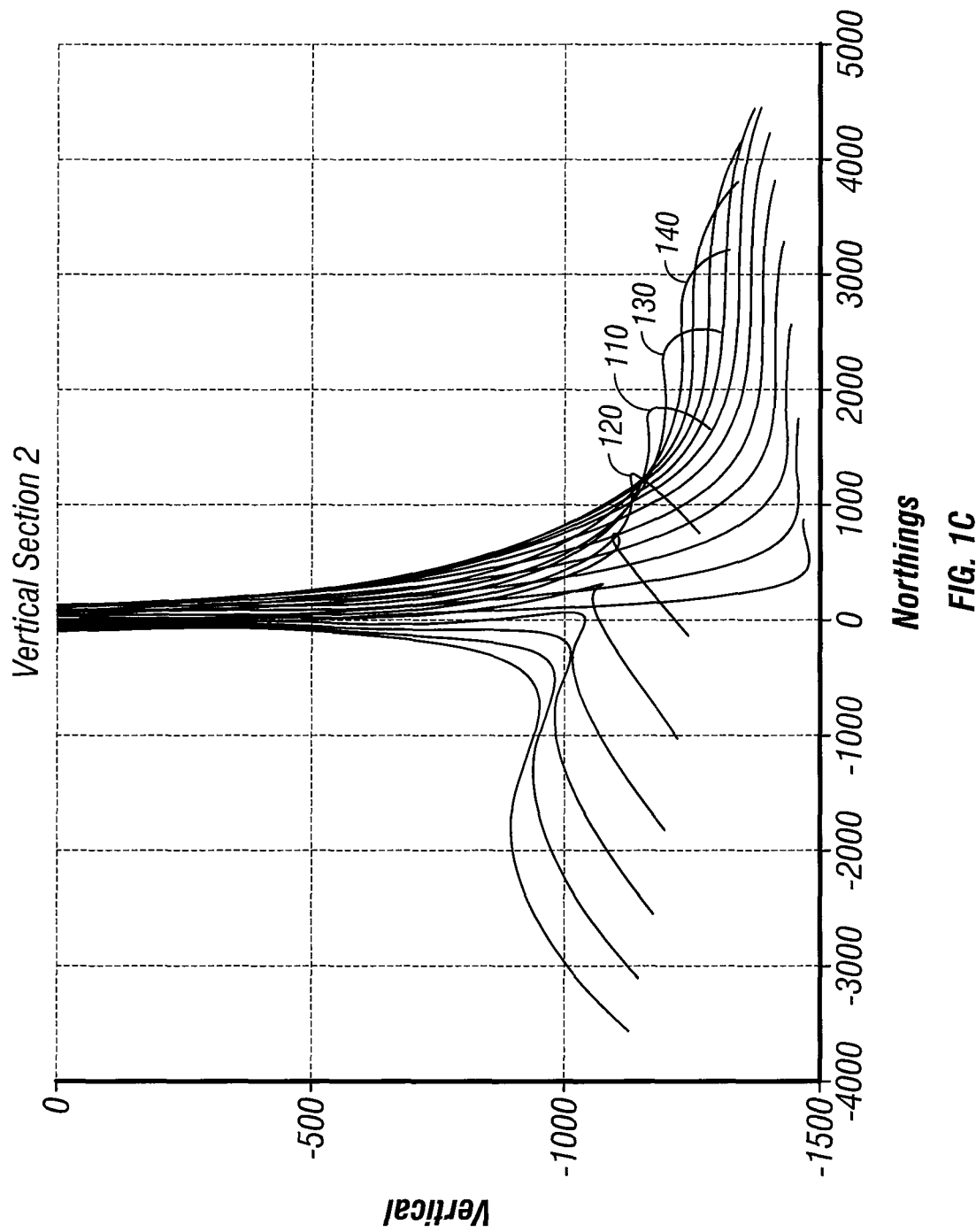
Figure 1D:
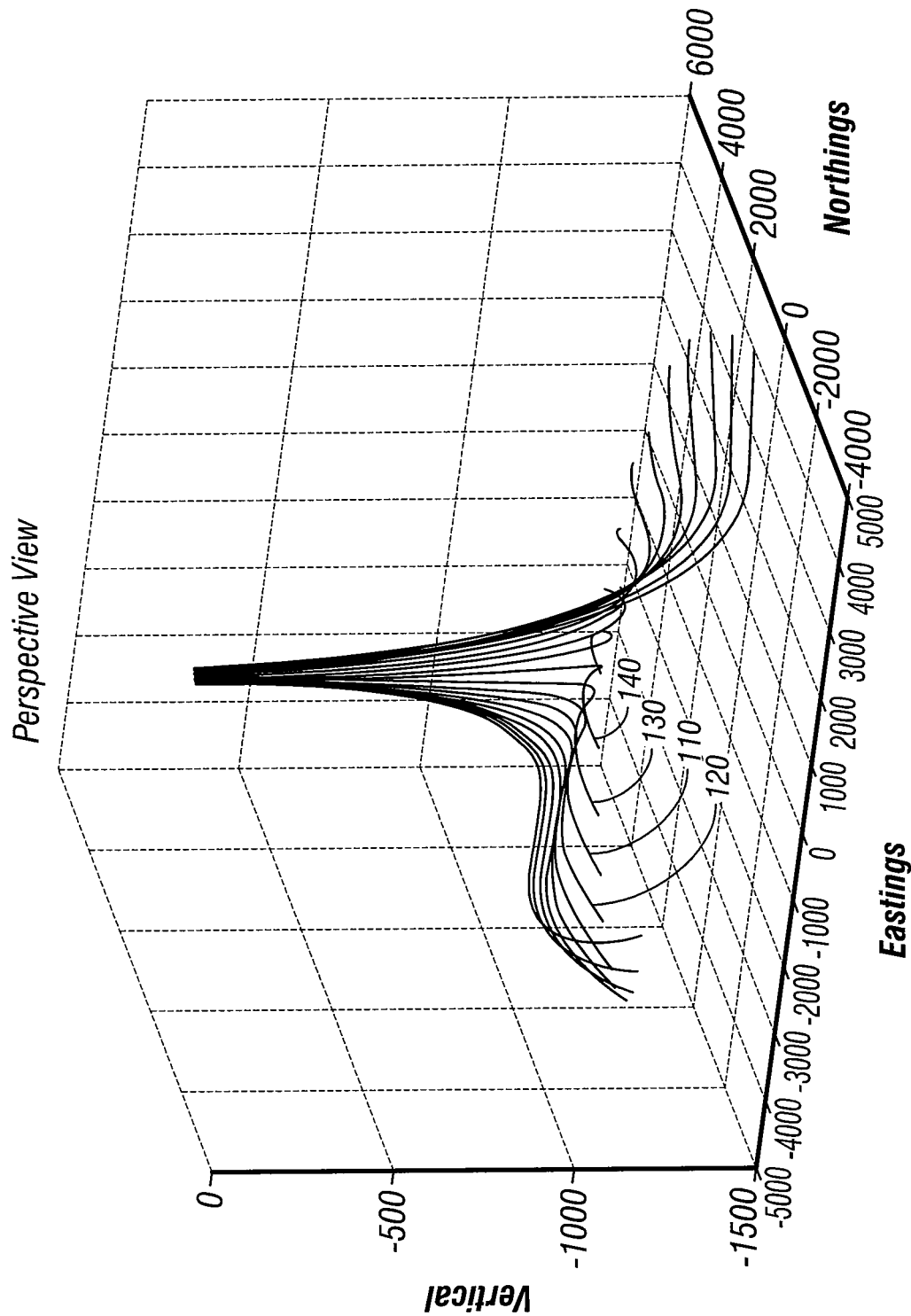

FIGS. 1a-1d illustrate well trajectories according to various embodiments of the invention. FIGS. 1a, 1b, 1c and 1d show a somewhat exaggerated set of well trajectories, typically originating from an offshore platform. FIG. 1a shows the trajectories in plan view, while FIGS. 1b and 1c show vertical sections (vertical and northings, and vertical and eastings). FIG. 1d shows an isometric view of the system of wells with three wells highlighted.

The well 110 represents a trajectory that is to be drilled, while the wells 120, 130, 140 designate the existing casing of neighboring wells. In one of the embodiments of this invention, low frequency electromagnetic signals are launched on the casings (near the well heads) of a number of neighboring wells. The magnetic fields from these signals are detected using one or more magnetometers in a measurement drillstring while drilling the well under construction.

By launching signals of different frequencies onto the casings, it is possible to determine the origin of the signal components. Position is determined relative to the neighboring wells by observing the magnetic field over short intervals of measured depth. In the low frequency regime, and near to the casing, the field arising at some distance D from a casing carrying a current I is given by Ampere's circuit law: $B_\theta = \mu \cdot I / (2\pi \cdot r)$, where $B_\theta$ is the azimuthal component of the magnetic field, $\mu$ is $4\pi \cdot 10^{-7}$ H/m for free space and most formations, r is the radiuis in meters, and I is the casing current in amperes. The "azimuthal" component of the magnetic field means the azimuthal component in a system of cylindrical coordinates centered locally in the casing.

In general, the current in the casing is not well known unless the resistivities are well known along the well profile. Thus, changes in the magnetic field are monitored. Assuming that the current is reasonably constant along the casing over short depth intervals, if there is a change in separation between the well under construction and the casing providing the signal (the casing into which the signal is launched), then the relative change in the magnetic field will be equal to, but opposite in sign to the relative change in the distance from the casing: $dB_\theta = (-B_\theta/r) * \delta r$.

This provides some indication in and of itself of whether one is approaching, receding from, or staying at a constant distance from the casing, but it does not provide the distance from the casing. However, it is possible to infer the distance from the casing by making several measurements as the measured depth changes and assuming that over relatively short distances (e.g., less than 200 feet, or 100 feet, or 50 feet, or 10 feet) the separation between the well being drilled and the casing varies as a linear function of the measured depth. It turns out that all one can determine using such a technique is the ratio of the separation at one of the points to the range of change of separation. If one has some initial estimate of r or of I, then it is possible to estimate the change in r.

Otherwise, consider drilling on a trajectory that is to run between three other cased wells, wells A, B and C. Suppose measurements are made relative to the three wells (either by using three different frequencies, or by only activating one well at a time using the same frequency) at two measured depths, MD1 and MD2. In most cases, one will know the trajectories of wells A, B and C to good approximation as a function of the measured depth of the well being drilled (i.e., the measured depth of the well under construction). In addition, because wells A, B and C are located in very similar environments, it should be possible to estimate the current at a measured depth in well B and well C as a function of the current at that depth in well A. To a good approximation, these currents should be in the same proportion as the currents that are launched at the tops of the casings of these same wells. For each reading, we know the ratio of the current to the separation. However, the three separation values are bounded by the known separations of wells A, B and C. It is therefore possible to constrain the solution such that the three distances, which may individually be distributed in circles around the three wells, define a common point.

Figure 2:
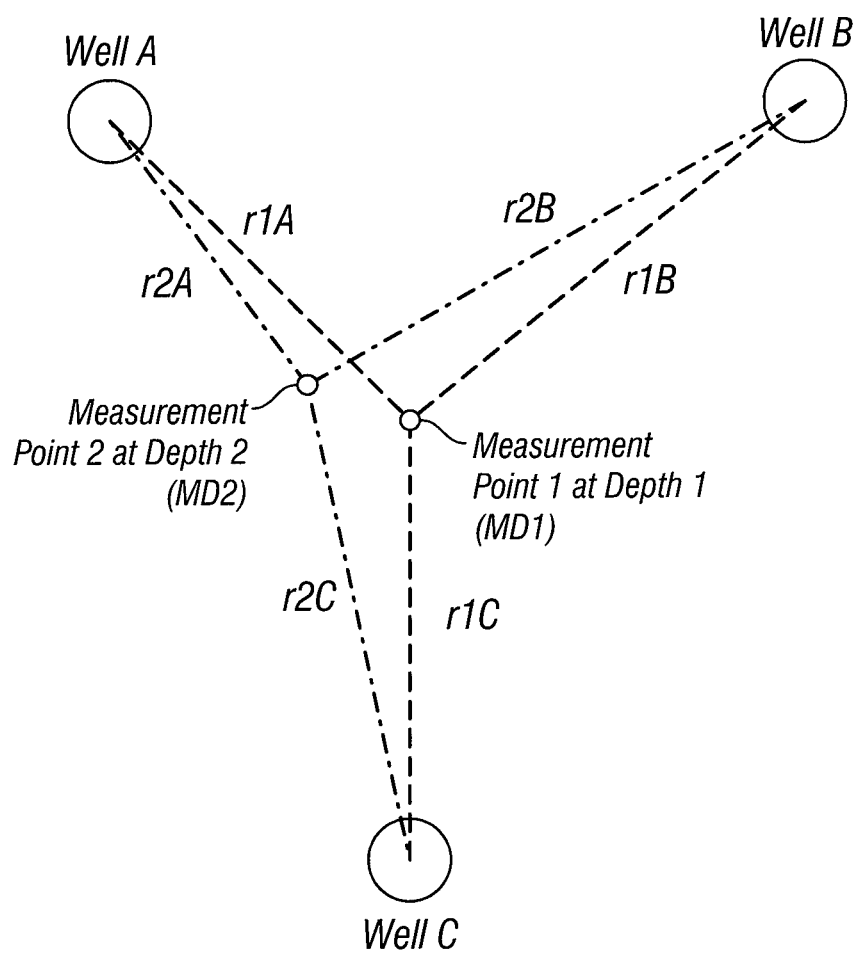
FIG. 2 is a top view of signal measurements according to various embodiments of the invention.

FIG. 2 is a top view of signal measurements according to various embodiments of the invention. Wells A, B and C are cased and act as guide wells. Signals at three different frequencies may be injected onto the casings of wells A, B and C at the surface, or the well casings may be energized at different times using the same frequency. The magnetic field is measured from each of the three casing elements at different points (e.g., measurement points 1 and 2) along the hole being drilled. The currents in the three casings are related in a known way. The three measured field values vary inversely with the distances from the wells and with the currents in the well casings. Furthermore, the three distances (e.g., r1A, r1B, r1C or r2A, r2B, r2C) ideally determine a single point that locates the well under construction. The ideal solution is shown in FIG. 3, while FIG. 4 illustrates the possible effects of uncertainty.

Figure 3:
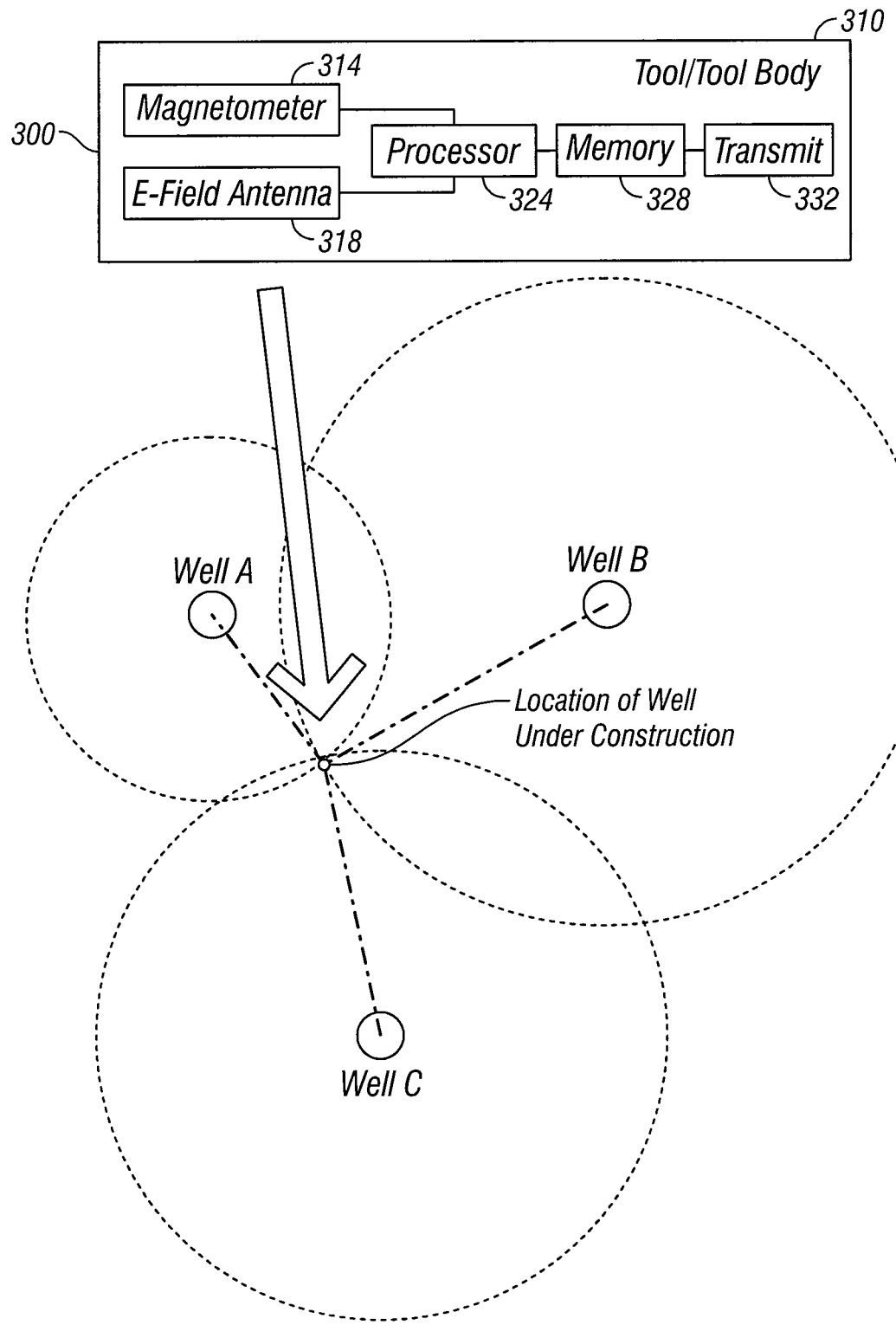
FIG. 3 is a top view of well location without uncertainties according to various embodiments of the invention.
Figure 4:
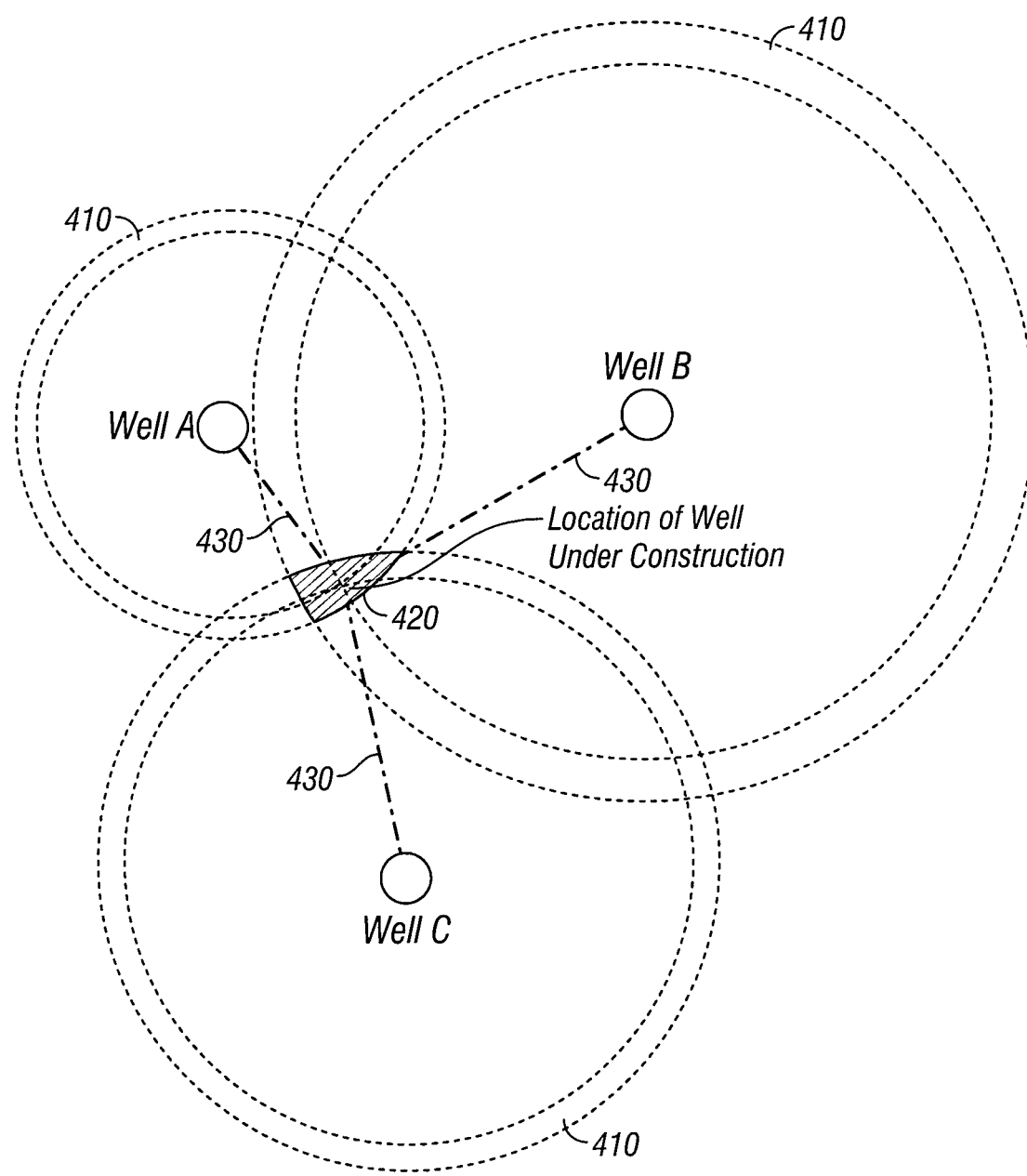
FIG. 4 is a top view of well location with zones of uncertainty according to various embodiments of the invention.

Thus, FIG. 3 is a top view of well location without uncertainties according to various embodiments of the invention. If there were no uncertainties, the location of the well being drilled (i.e., under construction) would be uniquely fixed by the three field measurements as these would lead to the unique determination of three distances from the reference wells. Given that there is usually some degree of uncertainty in the current measurement, there will likely also be some uncertainty in the point of intersection, that is, the location of the well under construction. Thus, in a practical sense, a zone where the measurements have been made is determined, which in turn provides a zone in which the well being drilled is located.

The apparatus 300, which may comprise any one or more of the components shown, may be located downhole. The apparatus 300 may comprise a downhole tool 310, a magnetometer 314 and/or electric field antenna 318, and a signal processor 324. The magnetometer 314 and/or electric field antenna 318 is attached to the downhole tool 310 and provides a signal. The apparatus 300 comprises a signal processor 324 to monitor the signal, in a well under construction, representing changes in at least one of a magnetic field or an electric field perturbed by a set of currents after each one of the set is launched in a corresponding set of existing well casings (wells A, B, C), and to determine a location of the well under construction in relation to the set of existing well casings based on the changes.

The apparatus 300 may comprise a memory 328. The memory 328 may be used to receive and store values corresponding to at least an amplitude of the signal over time. The memory 328 may be used to receive and store approximations of trajectories associated with the existing well casings, wherein the processor 324 is to use the approximations to bound the location of the well under construction.

In the apparatus 300, the signal processor 324 may be located at the surface, or be at least partially housed by the downhole tool 310. The apparatus 300 may comprise a telemetry transmitter 332 to communicate values associated with the signal to a surface logging facility, perhaps one that includes the signal processor 324. The surface facility may comprise a display (see element 396 of FIGS. 5, 6) to display the location of the well under construction with respect to the set of existing well casings.

FIG. 4 is a top view of well location with zones 410 of uncertainty according to various embodiments of the invention. Uncertainties in the trajectories of the reference wells (e.g., wells A, B, and C), in the magnetic field measurements and in the ratios of the currents in the reference wells leads to a region of uncertainty 420 in the position of the well being drilled.

In principle, it is possible that the three distances (radii 430 in FIG. 4) do not form intersecting circles. If this happens during the search for a solution, then one of the uncertainties in the solution must be higher than originally thought, and should be adjusted. As drilling progresses, the accuracy of the solution can be improved, since it is possible to utilize all of the information simultaneously.

In this case, the idea is to parametrize the trajectory of the well being drilled into the mathematical form of a simple curve (or straight line). The northings, eastings and vertical depths along the curve could have linear, quadratic, cubic, etc. dependence on the measured depth (or the northings and eastings could have linear, quadratic or cubic dependences on the vertical depth). Using measurements made at several points along the trajectory of the well being drilled, one can solve, not just for the locations at those points, but for the curve parameters. A parametrized curve tends to provide a filtered rendition of a borehole trajectory (where the filtering process reduces the effects of measurement noise).

In the embodiments described thus far, the signals from the casing currents are detected in the well being drilled using a magnetometer. However, it is also possible to detect these signals using an electric field antenna, such as is used in an electromagnetic telemetry system, which typically comprises an insulated gap in the telemetry sub that is connected to an amplifier.

In some embodiments, the points of initiation and detection can also be reversed. For example, some electromagnetic telemetry systems induce current along the drillstring for measurement while drilling operations. These currents can be used to induce currents in neighboring wells so as to be detectable at the heads of these wells. The detection can be made either using the potential differences between these well heads and a remote reference, the potential differences between the different well heads themselves, or the magnetic fields at or near the well heads.

For example, an offset well and a drillstring in a second well can be used to house electromagnetic uplink/downlink antennas. A third well may be used to house a rotary magnet ranging system probe. Downlink communications between the drillstring and the offset well result in a magnetic field that can be detected in the third well by the probe. Thus, the magnetic field emanating as a result of telemetry from a cased well can be detected. In an actively passive ranging technique, the probe or other detector can be located somewhere in a non-magnetic bottom hole assembly (BHA) in an open-hole well.

In this case, the telemetry uplink is typically received at the well head of the well being received. However, the signal will also appear at the heads of nearby wells. If the formation resistivity is known as a function of depth and the trajectories of the offset wells are also known, one can, given the measured depth of the well being drilled, predict what signal levels should be observed at the well heads as a function of the separation of the well being drilled from each of the neighboring boreholes. Determination of this position could be made using an iterative numerical method. It may also be desirable to calibrate the signals levels if this method is used. This can be done at an early stage in drilling the well when the positions relative to the other wells are well known and where the signal to noise ratio is high.

This type of operation may be useful because the same signal used for telemetry can also be used for collision avoidance. In addition, discrepancies between modeled signal levels and observed signal levels can be used to refine models for the electrical resistivity of the earth in the vicinity of the well being drilled, effectively providing a degree of borehole tomography. If sufficient data is acquired, observed signal strengths can be checked against modeled signal strengths. Local perturbations can be made to the resistivities used in modeling the signal strength. This can be carried out in an iterative process which seeks a better agreement between the observed and modeled data.

In all of the embodiments discussed thus far, a time varying field has been used. The field could also be provided at a single frequency, or could occupy a band of frequencies, as does a telemetry signal. In addition, direct currents (having substantially no frequency) could be applied to the casings of the reference wells, one at a time, and the results interpreted in the same manner as with the simultaneously measured time varying field values.

To launch the signal into the casing, operations can be conducted according to the description of U.S. Pat. Nos. 5,343,152 and 5,074,365. For example, a target well may have a casing. The target well may be an abandoned or a producing oil or gas well which exists in a field and is to be avoided by a later well being drilled, or may be an existing well that has blown out, and is to be intercepted at a selected depth below the surface of the earth by a relief borehole. Alternatively, the well may represent some other anomaly located in the earth, such as an electrically conductive geological formation, a drill string in an uncased well, or some other electrically conductive material which may be a target for interception or avoidance. For purposes of this disclosure, such material will be referred to as the target well, or just the target.

Near the target may be a second borehole which is being drilled, and which is to be directed so as either to intersect the target or to avoid it. For convenience, the second borehole will be referred to as a relief borehole. The relief borehole typically begins at a wellhead 16 the surface of the earth, and may be relatively close to the wellhead of the target well, or may be spaced by a distance. At the wellhead subsections or drill collars are secured end to end to form the drill string, and are lowered into the well as drilling progresses in conventional manner. Drilling mud is supplied to the interior bore of the string by way of fittings, again in conventional manner.

The bottom-most drill string subsection carries the drill bit in many cases. The drill bit subsection may be a bent sub which angles the drill bit with respect to the axis of the drill string to permit changes in the direction of drilling, or may be a straight section for straight-ahead drilling. With the use of a bent sub, the direction of drilling may be controlled by rotating the entire drill string from the wellhead, thereby turning the bent sub.

As is known, the drill bit may be driven by a motor which in turn is driven by the flow of drilling mud down the drill string bore. The mud flows out of the drill string at the bent sub and around the location of the drill bit and flows up and out of the well through the annular space around the outside of the string, carrying the material loosened by the drill up and out of the well through outlet fitting.

Located within the drill string bore may be an alternating magnetic field detector, or magnetometer. The detector may be adapted to detect alternating magnetic fields produced in the earth surrounding the target by alternating current flow induced in the conductive material (such as a well casing) of the target well. This current may be induced by way of an electrode located at the surface of the earth very close to, or, electrically connected to, the casing. The electrode induces a current flow I in the electrically conductive target casing, and this vertically flowing current produces a magnetic field surrounding the casing. The magnetic field lines are perpendicular to the direction of current flow I, and thus are generally horizontal when the well is vertical. The field extends outwardly from the target well casing to a distance dependent upon the magnitude of the current flow and upon the nature of the strata surrounding the target well and the relief borehole.

The electrode, which may be a conductive rod located in the earth near the wellhead or may be a connector for securing a cable to the metal casing, is connected by way of a cable to a source of alternating current (AC). The other side of the AC source is connected to a ground point at a location spaced away from the target well by a distance sufficient to ensure that the current will flow primarily in the casing. As the current flows downwardly in the casing, it will gradually be dissipated outwardly into the surrounding earth, and will return to the ground electrode, but since the current flow in the casing is highly concentrated, as compared to the current flow through the earth, the magnetic field produced by the casing current will predominate and will be detectable by the magnetometer.

The magnetometer, which may be a highly sensitive magnetic field detector, includes a pair of field sensors each having two spaced, parallel legs. The legs may be ferrite rods, each several inches long and surrounded by corresponding solenoidal windings. The magnetometer may be located in a suitable housing within the central opening of the drill string but alternatively may be mounted on the exterior thereof, as in reduced areas or notches formed on the outer surface of the drill string. In this latter configuration, the two legs of each sensor are mounted on diametrically opposite sides of the drill string so that they are spaced apart by a distance approximately equal to the diameter of the drill string. In either arrangement, the two legs of each sensor have their axes of maximum sensitivity parallel to each other, and perpendicular to the axis of the drill string, while the axes of maximum sensitivity of the two sensors are perpendicular to each other.

The sensors may be located near the bottom of the drill string; for example, in the penultimate drill string collar, hereafter referred to as the sensor collar, so as to detect the alternating magnetic field as near the face of drill as possible. Although significant vibration occurs at this location when measuring while drilling, nevertheless it is often very desirable to measure the field at the bottom of the borehole being drilled.

The magnetometer may have a fixed rotational position with respect to the drill string, thereby fixing the angular relationship between the magnetometer and the bent sub, so that the output signals from the sensors can be used to determine the direction in which the bent sub is facing relative the target, and thus can be used to control the direction of drilling.

If the magnetometer is mounted in a housing, it may be aligned within the sensor collar by means of radially extending spacers which serve to engage a suitable detent; for example, in the form of a slot formed on the interior of the drill string sensor collar. The slot guides one of the spacers, which may be longer than the remaining spacers, into the slot as the magnetometer housing is lowered into the sensor collar, and causes the magnetometer housing to rotate into a predetermined angular relationship with the sensor collar and with the bent sub. Since the magnetometer remains within the drill string during the actual drilling operation, it will ordinarily be aligned in the sensor collar at the surface, with the detent or slot arrangement insuring that the relationship between the sensor and the bent sub is known and remains constant during the drilling operation. The spacers also serve to align the magnetometer housing with the axis of the drill.

In order to permit the sensor to measure magnetic fields external to the drill string, the sensor collar can be fabricated from a nonmagnetic material such as stainless steel or Monel™ alloy. Since the drill string, and thus the collar, may carry a small portion of the electric current produced by the electrode, and since that current will produce stray magnetic fields within the interior of the drill string that will adversely affect the magnetometer's ability to detect exterior magnetic fields, care should be taken to minimize such effects.

When a relief borehole is being drilled, the borehole is initially directed toward the target through the use of conventional methods. The magnetometer can be located within the drill string or on its surface, and is operable during the actual drilling, although for greatest accuracy the drilling operation would normally be momentarily halted while measurements are made. The information obtained from the magnetometer is may be used to control the directional drilling of the relief borehole, among other uses, as described herein.

The surface current source may use an SCR inverter circuit with provision for current cutoff, and thus may include an SCR bridge connected across a DC supply, such as a battery. The control electrodes of the SCR devices can be connected to a controller which is driven by a stable, accurate clock, such as a quartz clock, to switch the SCR devices to provide an output current of, for example, 25 amperes at 400 volts and having a fundamental frequency in the range of up to 5 Hz, and down to 1 Hz or less, with an even harmonic, which may be a second harmonic. Waveforms may be alternating square waves or may be sinusoidal, and include first and second oppositely-going zero crossings in each cycle. The two waveforms combine to produce a resultant current in the earth which, in turn, produces current I in the target. This target current produces the magnetic field which also has that same waveform.

The resultant magnetic field consists of a series of low-frequency resultant pulses which have a different characteristic waveform at each zero crossing in one cycle of the fundamental waveform. Thus, for example, at the zero crossing in a first cycle of waveform, the combination of waveforms results in no signal, whereas at the zero crossing of one waveform in the first cycle, there is a resultant pulse 92 the other waveform. Thus, the other waveform has different characteristics (e.g., no pulse, or pulse) at each of the successive zero crossings which occur in each cycle of the fundamental wave. The detected magnetic field has the same distinctive characteristics, so that calculations based on the measured field can be synchronized with the fundamental frequency, without phase ambiguity to assure directional accuracy of the calculated values.

In operating such systems, a two-part alternating electric current can be supplied to the electrode at or very close to the wellhead of the target well, causing a resultant current I to flow through the steel casing in the target well. The resultant low frequency alternating current, produce the target magnetic field which can be detected by the AC field sensor (magnetometer) in the drill string. Analysis of the measured alternating field pattern provides information as to the direction from the sensor to the source of the magnetic field, and this directional information is used to control conventional guidance equipment to direct the drill bit so that drilling can be continued to either intersect or to avoid the casing, depending upon the purpose of the drilling operation. By utilizing a low frequency, two-part alternating current consisting of a fundamental waveform and an even harmonic from source, not only is phase ambiguity eliminated, but the effects of the earth's magnetic field on the sensor and on the target well casing are reduced, further increasing the accuracy of measurement. The magnetometer may include external sensors, or the sensors may be enclosed entirely in an electronics housing within the drill string.

Another method includes coupling one side of a signal source directly to the casing or the well head at the surface and then driving a stake into the ground (e.g., maybe 2-3 meters away), depending on the formation resistivity. Higher resistivity formations generally benefit from the use of larger/deeper stakes. The other side of the signal source can be connected to the stake or to another well head. Yet another possibility includes operating according to the description that follows, as described more fully in U.S. Pat. No. 6,150,954.

A subsea template electromagnetic telemetry system may be used. For example, one that is capable of telemetering real time data between the surface and downhole devices using electromagnetic waves to carry the information. The system transmits and receives electromagnetic signals below the sea floor and relays the information carried in the electromagnetic signals through the sea water to the surface. The system may operate to communicate commands to specific downhole devices and receive confirmation that the operation requested in the command has occurred.

The system may comprise an electromagnetic downlink and pickup apparatus that includes a subsea conductor and a surface installation. The subsea conductor may be, for example, a subsea template of an offshore production platform. The subsea conductor and the surface installation may be electrically connected using a pair of conduits. The conduits form a pair terminals on the subsea conductor between which a voltage potential may be established, thereby providing a path for current flow therebetween.

The surface installation may includes a signal generator and a signal receiver. The signal generator may operate to inject a current carrying information into the subsea conductor that will generate electromagnetic waves carrying the information which are propagated downhole through the earth. The signal receiver interprets information carried in a current generated in the subsea conductor by electromagnetic waves received by the subsea conductor.

The conduits electrically connecting the subsea conductor to the surface installation may be electrical wires. Alternatively, one or both of the conduits electrically connecting the subsea conductor to the surface installation may be riser pipes including platform legs, conductor pipes of wells and the like.

The subsea conductor may have an electrical coupling extending outwardly therefrom and extending above the sea floor to provide a connection between an electric wire and the subsea conductor. The electrical coupling may be a post, a ring or the like.

Figure 5:
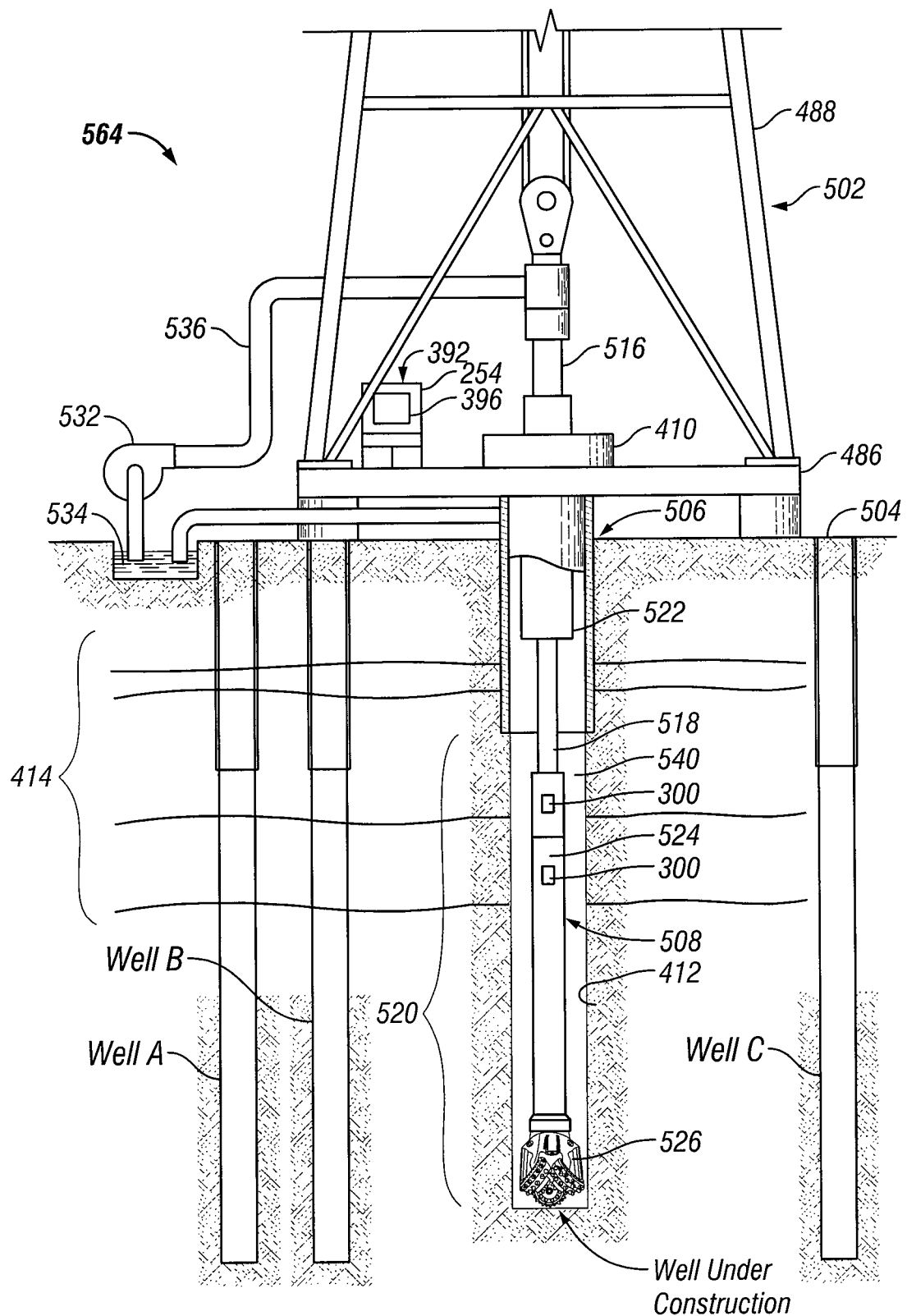
FIGS. 5-6 illustrate system embodiments of the invention.
Figure 6:
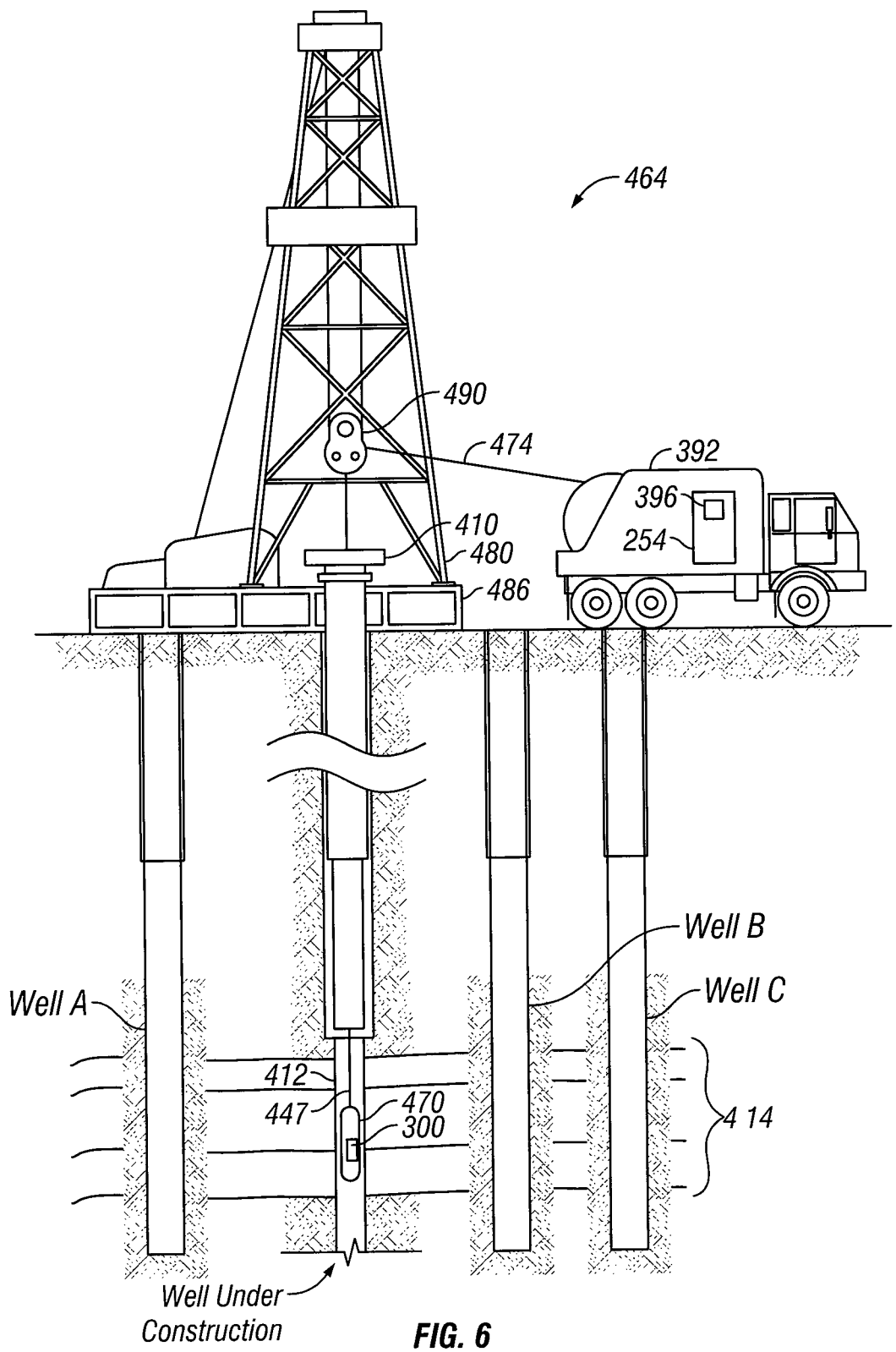

FIGS. 5-6 illustrate system embodiments of the invention. For example, FIG. 5 illustrates a drilling rig system 564 embodiment of the invention, and FIG. 6 illustrates a wireline system 464 embodiment of the invention. Thus, systems 464, 564 may comprise portions of a tool body 470 as part of a wireline logging operation, or of a downhole tool 524 as part of a downhole drilling operation.

Drilling of oil and gas wells is commonly carried out using a string of drill pipes connected together so as to form a drilling string that is lowered through a rotary table 410 into a wellbore or borehole 412. Turning now to FIG. 5, it can be seen how a system 564 may form a portion of a drilling rig 502 located at the surface 504 of a well 506. The drilling rig 502 may provide support for a drill string 508. The drill string 508 may operate to penetrate a rotary table 410 for drilling a borehole 412 through subsurface formations 414. The drill string 508 may include a Kelly 516, drill pipe 518, and a bottom hole assembly 520, perhaps located at the lower portion of the drill pipe 518. In some embodiments, apparatus 300 may be carried as part of the drill string 508 or the downhole tool 524.

The bottom hole assembly 520 may include drill collars 522, a downhole tool 524, and a drill bit 526. The drill bit 526 may operate to create a borehole 412 by penetrating the surface 504 and subsurface formations 414. The downhole tool 524 may comprise any of a number of different types of tools including MWD (measurement while drilling) tools, LWD tools, and others.

During drilling operations, the drill string 508 (perhaps including the Kelly 516, the drill pipe 518, and the bottom hole assembly 520) may be rotated by the rotary table 410. In addition to, or alternatively, the bottom hole assembly 520 may also be rotated by a motor (e.g., a mud motor) that is located downhole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation 414 cuttings created by operating the drill bit 526.

Thus, a system for drilling a well (i.e., the well under construction) may be constructed to operate so as to avoid collision with existing well casings A, B, C in which currents are launched at pre-selected frequencies. The currents are launched onto the existing casings so as to produce time varying magnetic and/or electric fields of a magnitude that is detectable at points along the path of the well being drilled. Analysis of the acquired signals could be carried out either downhole or at the earth's surface, as desired.

FIG. 6 shows a well during wireline logging operations. A drilling platform 486 is equipped with a derrick 480 that supports a hoist 490. Here it is assumed that the drilling string has been temporarily removed from the borehole 412 to allow a wireline logging tool body 470, such as a probe or sonde that carries a sonic tool 200, to be lowered by wireline or logging cable 474 into the borehole 412. Typically, the tool body 470 is lowered to the bottom of the region of interest and subsequently pulled upward at a substantially constant speed.

During the upward trip, apparatus 300 included in the tool body 470 may be used to perform measurements in the borehole 412 as they pass by. The measurement data can be communicated to a surface logging facility 392 for storage, processing, and analysis. The logging facility 392 may be provided with electronic equipment for various types of signal processing, which may be implemented by any one or more of the components of the apparatus 300 claimed as apparatus or a system in the claims below, and/or shown in FIG. 3. The log data is similar to that which may be gathered and analyzed during drilling operations (e.g., during logging while drilling (LWD) operations).

The boreholes 110; 412; apparatus 300; logging facility 392; display 396; rotary table 410; formation 414; systems 464, 564; tool body 470; drilling platform 486; derrick 480; hoist 490; logging cable 474; drilling rig 502; well 506; drill string 508; Kelly 516; drill pipe 518; bottom hole assembly 520; drill collars 522; downhole tool 524; drill bit 526; mud pump 532; mud pit 534; and hose 536 may all be characterized as "modules" herein. Such modules may include hardware circuitry, and/or a processor and/or memory circuits, software program modules and objects, and/or firmware, and combinations thereof, as desired by the architect of the apparatus 300 and systems 464, 564, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 300 and systems 464, 564 are intended to provide a general understanding of the structure of various embodiments, and they are not intended to serve as a complete description of all the elements and features of apparatus and systems that might make use of the structures described herein.

Applications that may incorporate the novel apparatus and systems of various embodiments include a variety of electronic systems, such as televisions, cellular telephones, personal computers, workstations, radios, video players, vehicles, and location technology (e.g., GPS (Global Positioning System) location technology), signal processing for geothermal tools and smart transducer interface node telemetry systems, among others. Some embodiments include a number of methods.

Figure 7:
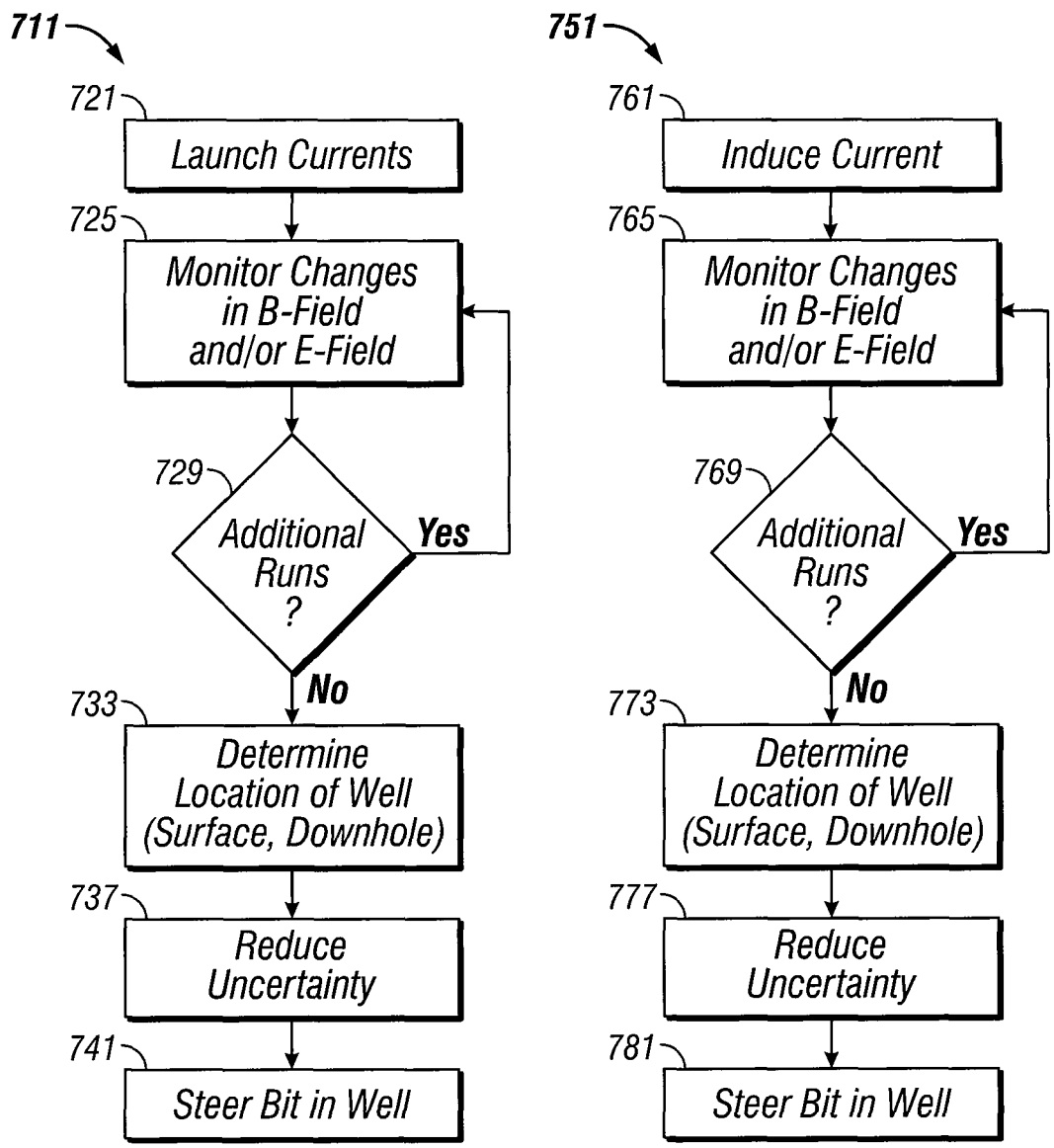
FIG. 7 is a flow chart illustrating several methods according to various embodiments of the invention.

FIG. 7 is a flow chart illustrating several methods according to various embodiments of the invention. For example, a processor-implemented method 711 to execute on one or more processors that perform methods to locate a well under construction, may begin at block 721 with launching a set of currents into a corresponding set of existing well casings and then, at block 725, monitoring, in a well under construction, changes in at least one of a magnetic field or an electric field perturbed by the set of currents after each one of the set is launched.

The method 711 may include, at block 729, determining whether additional data acquisition cycles will be accomplished. If not, then the method 711 may go on to block 733 to include determining a location of the well under construction in relation to the set of existing well casings based on the changes.

The activity at block 733 may include determining the location as part of an uncertain range of locations. The method 711 may then continue on to block 737 with reducing the uncertain range of locations by reducing an uncertainty in measuring at least one of the set of currents, perhaps by conducting additional measurement, or by increasing the resolution of the measurement instrumentation.

The method 711 may go on to block 741 to include steering a bit while drilling the well under construction according to the location of the well under construction.

In some embodiments, a method 751 begins at block 761 with inducing current into a drillstring located in a well under construction and then, at block 765, with monitoring, at a set of existing well casings, changes in at least one of a magnetic field or an electric field perturbed by the current after the current is induced.

The method 751 may include, at block 769, determining whether additional data acquisition cycles will be accomplished. If not, then the method 751 may go on to block 773 to include determining a location of the well under construction in relation to the set of existing well casings based on the changes.

The activity at block 773 may include determining the location as part of an uncertain range of locations. The method 751 may then continue on to block 777 with reducing the uncertain range of locations by reducing an uncertainty in measuring at least one of the set of currents, perhaps by conducting additional measurement, or by increasing the resolution of the measurement instrumentation.

The method 751 may go on to block 781 to include steering a bit while drilling the well under construction according to the location of the well under construction.

Additional activities forming a part of either one or both of methods 711 and 751 are listed in the activities for methods and articles claimed below. Thus, it should be noted that the methods described herein do not have to be executed in the order described, or in any particular order. Moreover, various activities described with respect to the methods identified herein can be executed in iterative, serial, or parallel fashion. Some activities may be added, and some of the included activities may be left out. Information, including parameters, commands, operands, and other data, can be sent and received in the form of one or more carrier waves.

Figure 8:
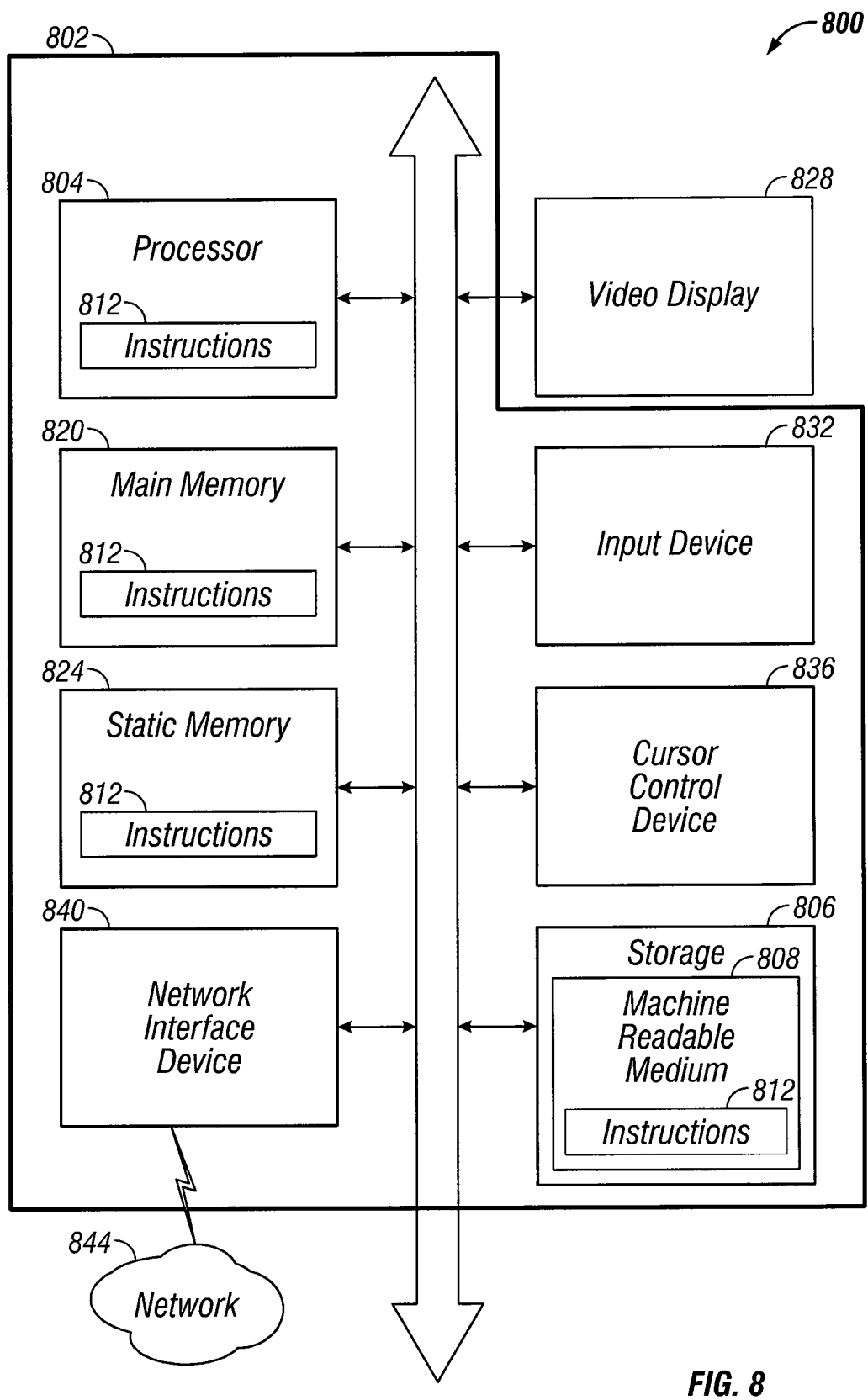
FIG. 8 is a block diagram of an article according to various embodiments of the invention.

FIG. 8 is a block diagram of an article 800 of manufacture, including a specific machine 802, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 800 of manufacture, such as a computer, a memory system, a magnetic or optical disk, some other storage device, and/or any type of electronic device or system may include one or more processors 804 coupled to a machine-readable medium 808 such as a memory (e.g., removable storage media, as well as any memory including an electrical, optical, or electromagnetic conductor comprising tangible media) having instructions 812 stored thereon (e.g., computer program instructions), which when executed by the one or more processors 804 result in the machine 802 performing any of the actions described with respect to the methods above.

The machine 802 may take the form of a specific computer system having a processor 804 coupled to a number of components directly, and/or using a bus 816. Thus, the machine 802 may be similar to or identical to the workstation 392 shown in FIGS. 5 and 6, or the processor in the apparatus 300 of FIG. 3.

Turning now to FIG. 8, it can be seen that the components of the machine 802 may include main memory 820, static or non-volatile memory 824, and mass storage 806. Other components coupled to the processor 804 may include an input device 832, such as a keyboard, or a cursor control device 836, such as a mouse. An output device 828, such as a video display, may be located apart from the machine 802 (as shown), or made as an integral part of the machine 802.

A network interface device 840 to couple the processor 804 and other components to a network 844 may also be coupled to the bus 816. The instructions 812 may be transmitted or received over the network 844 via the network interface device 840 utilizing any one of a number of well-known transfer protocols (e.g., HyperText Transfer Protocol). Any of these elements coupled to the bus 816 may be absent, present singly, or present in plural numbers, depending on the specific embodiment to be realized.

The processor 804, the memories 820, 824, and the storage device 806 may each include instructions 812 which, when executed, cause the machine 802 to perform any one or more of the methods described herein. In some embodiments, the machine 802 operates as a standalone device or may be connected (e.g., networked) to other machines. In a networked environment, the machine 802 may operate in the capacity of a server or a client machine in server-client network environment, or as a peer machine in a peer-to-peer (or distributed) network environment.

The machine 802 may comprise a personal computer (PC), a workstation, a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 802 is illustrated, the term "machine" shall also be taken to include any collection of machines that individually or jointly execute a set (or multiple sets) of instructions to perform any one or more of the methodologies discussed herein.

While the machine-readable medium 808 is shown as a single medium, the term "machine-readable medium" should be taken to include a single medium or multiple media (e.g., a centralized or distributed database, and/or associated caches and servers, and or a variety of storage media, such as the registers of the processor 804, memories 820, 824, and the storage device 806 that store the one or more sets of instructions 812. The term "machine-readable medium" shall also be taken to include any medium that is capable of storing, encoding or carrying a set of instructions for execution by the machine and that cause the machine 802 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Using the apparatus, systems, and methods disclosed, those in the petroleum recovery industry and other industries may now be able to more accurately access the location of a well being drilled within a crowded field of wells, perhaps while production continues on all wells in the field. Increased operational efficiency and client satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description and the figures, with each claim standing on its own as a separate embodiment.

What is claimed is:

1. An apparatus, comprising:
    a downhole tool;
    at least one of a magnetometer or an electric field antenna attached to the downhole tool, the at least one of the magnetometer or the electric field antenna to provide a signal; and
    a signal processor to monitor the signal, in a well under construction, representing changes in at least one of a magnetic field or an electric field perturbed by a set of currents after each one of the set is launched in a corresponding set of three or more existing well casings, and to determine a location of the well under construction in relation to the set of existing well casings based on the changes, wherein each of the existing well casings is associated with a corresponding current launching apparatus to launch one of the set of currents.

2. The apparatus of claim 1, further comprising:
    a memory to receive and store values corresponding to at least an amplitude of the signal over time.

3. The apparatus of claim 1, further comprising:
    a telemetry transmitter to communicate values associated with the signal to a surface logging facility that includes the signal processor.

4. The apparatus of claim 1, wherein the signal processor is at least partially housed by the downhole tool.

5. A system, comprising:
    a downhole tool;
    at least one of a magnetometer or an electric field antenna located proximate to each one of a set of three or more existing well casings, the at least one of the magnetometer or the electric field antenna to provide a set of signals; and
    a signal processor to monitor the set of signals representing changes in at least one of a magnetic field or an electric field perturbed by current induced in a drillstring coupled to the downhole tool and located in a well under construction, and to determine a location of the well under construction in relation to the set of existing well casings based on the changes.

6. The system of claim 5, wherein the downhole tool comprises one of a wireline tool or a measurement while drilling tool.

7. The system of claim 5, further comprising:
    a memory to receive and store approximations of trajectories associated with the existing well casings, wherein the processor is to use the approximations to bound the location.

8. The system of claim 5, further comprising:
    a display to display the location with respect to the set of existing well casings.

9. The system of claim 5, further comprising:
    a surface computer comprising the signal processor.

10. A processor-implemented method to execute on one or more processors that perform the method, comprising:
    launching a set of currents into a corresponding set of three or more existing well casings, wherein each of the existing well casings is associated with a corresponding current launching apparatus to launch one of the set of currents;
    monitoring, in a well under construction, changes in at least one of a magnetic field or an electric field perturbed by the set of currents after each one of the set is launched; and
    determining a location of the well under construction in relation to the set of existing well casings based on the changes.

11. The method of claim 10, wherein the launching further comprises:
    launching each one of the set of currents into a point near a well head of each one of the existing well casings.

12. The method of claim 10, wherein the launching further comprises:
    substantially simultaneously launching the set of currents having different frequencies.

13. The method of claim 10, wherein the launching further comprises:
    launching members in the set of currents at different times.

14. The method of claim 10, wherein the monitoring further comprises:
monitoring using one of a magnetometer or an electric field antenna.

15. The method of claim 10, wherein the monitoring further comprises:
monitoring the changes at different depths of the well under construction.

16. The method of claim 10, wherein the changes comprise relative changes.

17. The method of claim 10, further comprising:
steering a bit while drilling the well under construction according to the location.

18. A processor-implemented method to execute on one or more processors that perform the method, comprising:
inducing current into a drillstring located in a well under construction;
monitoring, at a set of three or more existing well casings, changes in at least one of a magnetic field or an electric field perturbed by the current after the current is induced, wherein each of the existing well casings is associated with corresponding measurement instrumentation to conduct the monitoring; and
determining a location of the well under construction in relation to the set of existing well casings based on the changes.

19. The method of claim 18, wherein the monitoring further comprises:
detecting differences between at least one of potentials at well heads associated with the set of existing well casings, the potentials at the well heads and a reference, or magnetic fields proximate to the well heads.

20. The method of claim 18, wherein the inducing further comprises:
inducing the current by operating an electromagnetic telemetry system attached to the drillstring.

21. The method of claim 18, further comprising:
steering a bit while drilling the well under construction according to the location.

22. An article including a non-transitory machine-readable medium having instructions stored therein, wherein the instructions, when executed, result in a machine performing:
launching a set of currents into a corresponding set of three or more existing well casings, wherein each of the existing well casings is associated with a corresponding current launching apparatus to launch one of the set of currents;
monitoring, in a well under construction, changes in at least one of a magnetic field or an electric field perturbed by the set of currents after each one of the set is launched; and
determining a location of the well under construction in relation to the set of existing well casings based on the changes.

23. The article of claim 22, wherein the launching further comprises:
launching members in the set of currents having substantially no frequency.

24. The article of claim 22, wherein the instructions, when accessed, result in a machine performing:
determining the location downhole, using a processor located in the well under construction.

25. The article of claim 22, wherein the instructions, when accessed, result in a machine performing:
determining the location as part of an uncertain range of locations; and
reducing the uncertain range of locations by reducing an uncertainty in measuring at least one of the set of currents.

26. An article including a non-transitory machine-readable medium having instructions stored therein, wherein the instructions, when executed, result in a machine performing:
inducing current into a drillstring located in a well under construction;
monitoring, at a set of three or more existing well casings, changes in at least one of a magnetic field or an electric field perturbed by the current after the current is induced, wherein each of the existing well casings is associated with corresponding measurement instrumentation to conduct the monitoring; and
determining a location of the well under construction in relation to the set of existing well casings based on the changes.

* * * * *